United States Patent [19]

Novak et al.

[11] 4,055,408
[45] Oct. 25, 1977

[54] FOREHEARTH HOMOGENIZATION METHOD AND APPARATUS

[75] Inventors: John D. Novak, Sylvania, Ohio; Joseph W. Sell, Cranford, N.J.

[73] Assignee: Owens-Illinois, Inc., Toledo, Ohio

[21] Appl. No.: 742,408

[22] Filed: Nov. 17, 1976

[51] Int. Cl.² ............................................. C03B 9/18
[52] U.S. Cl. .................................. 65/135; 65/179; 65/346
[58] Field of Search ............... 65/134, 135, 136, 179, 65/335, 346, 178, 180

[56] References Cited

U.S. PATENT DOCUMENTS

| 2,467,809 | 4/1949 | Cannon, Jr. et al. | 65/134 |
| 3,463,627 | 8/1969 | LeBlanc | 65/134 |

*Primary Examiner*—Arthur D. Kellogg
*Attorney, Agent, or Firm*—D. T. Innis; E. J. Holler

[57] ABSTRACT

A forehearth for feeding molten glass to a flow feeder, a set of blenders, and a set of homogenizers are spaced from each other along the length of the forehearth with three evenly spaced vertically positioned elongated plates located between the set of blenders and the set of homogenizers. The particular arrangement provides a system for eliminating, to a great extent, cords at the feeder.

8 Claims, 2 Drawing Figures

FOREHEARTH HOMOGENIZATION METHOD AND APPARATUS

BACKGROUND OF THE INVENTION

It has long been known that stirring can markedly improve the quality of glass, especially when done when the glass is in a relatively viscous state just before it is cast. With the recent emphasis on reduction of weight and wall thicknesses of many mass produced glass products such as, for example, television envelopes, non-returnable beverage bottles, improvement in the quality of the glass is becoming increasingly important. Striae, cords and other imperfections constitute localized weaknesses in the glass products, rendering them unmerchantable. Reduction of striae and other imperfections permits the achievement of lighter weight glass products because it enables a reduction in wall thickness without loss of strength relative to similar products in which account must be taken of considerable localized weakening due to the presence of cords and striae.

Thus, even for products which, heretofore, have been made of glass of relatively poor quality, there is a growing demand for glass of relatively high quality, of a quality even approaching that ordinarily required in the manufacture of optical ware.

Although the practice of the present invention is expected to have relatively wide application, its immediate utilization on a practical commercial scale is thought to have its greatest potential in connection with the standard type of industrial equipment on which substantially all of the mass produced glassware in the United States is made. The standard equipment includes a melting furnace where the initial batch ingredients of the glass are melted and heated to a relatively high temperature to form a glass of relatively low viscosity, a forehearth where the glass discharged from the melting furnace is cooled to make it more viscous, and a discharge bowl, or spout which receives the glass from the forehearth and discharges it through an orifice in the form of gobs. The apparatus of the present invention is especially suitable for substitution in place of the final section of the standard forehearth for stirring the glass just before it is delivered to the spout.

The standard forehearth comprises, in the order of flow of the glass from the melting furnace to the spout, first, a cooling section, and then a conditioning, or equalizing section. Both heating fires and cooling wind are provided in the cooling section, and heating fire is provided in the conditioning section but basically the design is intended to accomplish substantially all of the cooling in the cooling section, and to render the temperature of the entire body of flowing glass uniform throughout its thickness and width in the conditioning section. Heretofore, some stirring has been done at the entrance of the conditioning section by placing rotating paddles or turbines in the molten stream of glass at that point. Such stirring as heretofore carried out has been effective to improve the uniformity of temperature of the molten stream of glass and to reduce thermal gradients in it, but has failed in significantly reducing the amount of striae and cords in the glass and for physically homogenizing it.

SUMMARY OF THE INVENTION

Method and apparatus for mixing and blending molten glass in a forehearth in which a pair of helical blenders mounted upstream of the feeder end of the forehearth are rotated such that the blenders raise the glass in the zone of their influence. Downstream toward the feeder end of the forehearth, a plurality of transversely spaced helical homogenizers are rotated to effectively push the glass downward in their zone of influence and intermediate the blenders and homogenizers are positioned a plurality of elongated vertical plates with their lower edges resting on the bottom of the forehearth and extending the full depth of the molten glass such that movement of the glass from the blenders to the homogenizers will be such that cords or other stria will be attenuated by the plates.

DETAILED DESCRIPTION OF THE DRAWINGS

Figure 1:
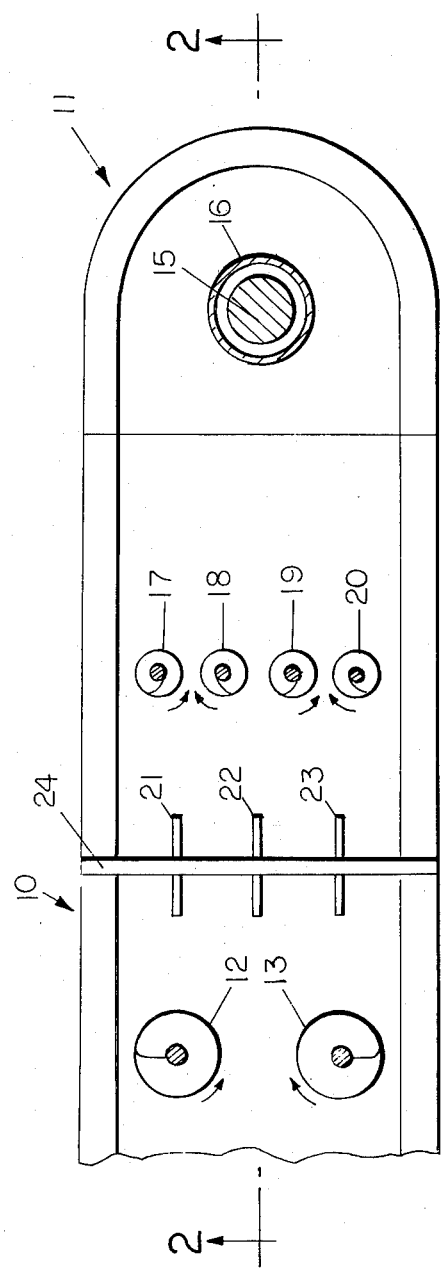
FIG. 1 is a plan view of the apparatus of the invention.
Figure 2:
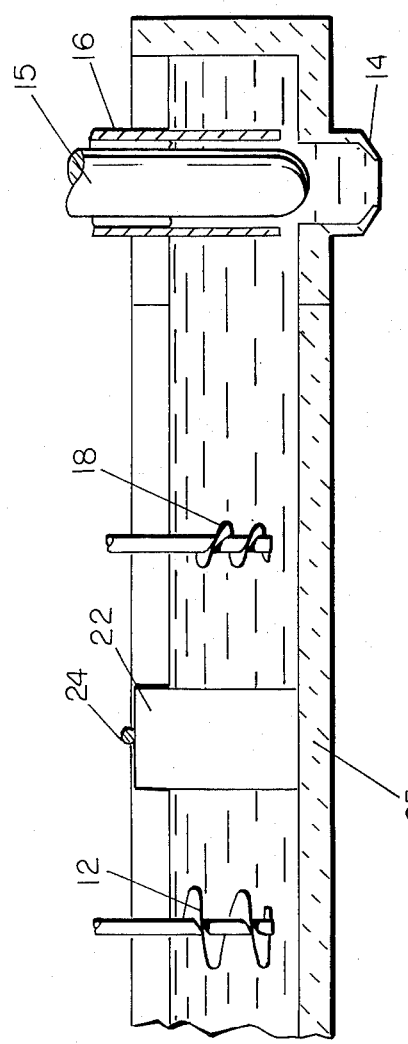
FIG. 2 is a cross-sectional view taken at 2—2 of FIG. 1.

With particular reference to FIGS. 1 and 2, there is shown what is normally termed the conditioning section 10 and feeder bowl 11 of a typical flow-type forehearth. Within the conditioning section 10, there is positioned two blenders 12 and 13. In the particular configurations shown, the conditioning section 10 has a width of approximately 26 inches with the glass therein being at a depth of about 12 inches. Each of the blenders 12 and 13 may be approximately 7 inches in diameter. The vertical axis of the blenders 12 and 13 is positioned approximately $6\frac{1}{2}$ inches inwardly from the respective sidewalls of the conditioning section. It should be understood that the flow of glass in the apparatus shown will be from the left to the right with the glass issuing in the form of gobs from an orifice 14 positioned below an opening formed in the bottom of the forehearth. Immediately above the orifice 14 is a plunger 15 which serves to control the formation of gobs in the usual manner. A tube 16 surrounds the plunger 15 and is rotated to maintain the glass in the vicinity of the orifice relatively even in temperature.

Upstream from the tube 16 are four homogenizers 17, 18, 19 and 20. As a particular example, the homogenizers are 4 inches in diameter. The homogenizers 17–20 are rotated in the direction indicated by the arrows in FIG. 1. The blenders 12 and 13 are also rotated in the direction indicated by the arrows in FIG. 1. Intermediate the blenders and homogenizers are positioned three 8-inch long plates 21, 22 and 23. The plates are supported by a bar 24 which extends across the width of the forehearth, as can best be seen in FIG. 1. The plates are generally rectangular in shape and evenly spaced from each other and are equally spaced from the blenders and homogenizers. The lower edge of the plates is in contact with the bottom of a forehearth 25 and, in conjunction with the adjacent sidewalls of the fourhearth, provide shear planes for the moving glass. These plates are stationary and formed of a material that is capable of withstanding the glass temperature and erosion characteristics of the moving glass. The blenders are homogenizers, as can be seen from the drawings, are essentially helical mixers which are spaced from the bottom of the forehearth an amount, 2 inches – 3.5 inches, sufficient to avoid excessive shearing of the glass on the bottom thereof.

Applicants have found that the use or positioning of stationary vertical plates in the forehearth increases the shear stress and attenuate cord.

The low level of shear stress with the arrangement described does not generate seeds. With the particular arrangement shown in the drawing, it can easily be seen that equal width flow channels between the plates are used and this is so as to minimize non-symmetric side-to-side variations of mixing effectiveness. Several other configurations were tried by applicants in a model forehearth with plates of 4 inches in length, 8 inches in length and 12 inches in length being tried. All plate configurations when positioned between blenders and homogenizers had some effect in mixing cord. It was found, however, that 4-inch plates were less effective for cord which would appear at the top and middle center of the forehearth flow channel than either the 8-inch or 12-inch long plates. For all of the plates, mixing effectiveness is improved when they are positioned between the blenders and homogenizers for all top and middle center cord. There is not much change in middle side and bottom cord; however, these are affected by the mixing systems anyway. The 8-inch plates where found to be more effective in mixing cord than the 12-inch plates, primarily because the 8-inch plates created less restriction to the flow patterns around the stirrers than the 12-inch plates.

It should be noted that the introduction of stationary plates within the forehearth does increase the glass flow resistance and for this reason, in order to maintain a 12-inch glass level at the feeder end of the forehearth, in the feeder bowl, it would be necessary to increase the glass level in the refiner up to about one-half inch, depending upon the actual flow rate through the forehearth.

With the particular arrangement where the blenders move the glass upward and the monogenizers are moving the glass downward, much of the glass will be moving from the blenders to the homogenizers in the upper zone thereof within which the plates are positioned. In this manner, the plates will effectively attenuate cords which might be present in the glass.

Several other factors should be considered. The 7-inch diameter blenders, when operated at 20 rpm and because of their large size, must be carefully monitored to be effective. The mixing effectiveness of the 7-inch diameter blenders with 4-inch homogenizers results in an increased radius of influence and the circulation of fluid around the blenders is such that chances of short circuiting the influence of the blenders is greatly diminished. As might be expected, the 7-inch diameter blenders do entrap air at a lower angular velocity than would 4-inch diameter blender. These blenders, however, compensate for this adverse effect by being capable of operating at a lower angular velocity and yet achieving improved mixing effectiveness.

In general, the radius of influence is the farthest radial distance from the stirrer which the rotation of the stirrers significantly influences the fluid. For all fluid to be mixed, the stirrer operation must incorporate significant interaction among the radii of influence and the stationary forehearth surface. If sufficient overlapping of the radii of influence does not occur, then significant short circuiting around the stirrers will permit cord to flow past the stirrers without being mixed.

Applicants have found that to reduce undesirable mixing variations, the stirring should be symmetrical about the longitudinal centerline of the forehearth. Non-symmetrical stirring produces regions of short circuiting. A symmetrical stirring set-up minimizes side-to-side variations and reduces short circuiting. To reduce the possibility of one stirring arrangement passing unmixed fluid to the weak region of another stirring arrangement, consecutive stirring set-ups should be different. Perhaps the easiest way to obtain different stirring set-ups and still maintain symmetry, is to have a different even number of stirrers at consecutive stirring locations. The operation of these stirring set-ups must be symmetric with respect to the longitudinal centerline of the forehearth.

Another consideration is the possibility of producing shear induced seeds by operation of a stirrer. It is known that seed generation is related to shear stress, shear strain rate or other shear related function. With this in view, care should be taken with regard to the amount of shearing involved with the mixing of the glass. Furthermore, with helical mixers of the type disclosed herein, there are limits to the velocity which the stirrers may be rotated to avoid both shear induced seeds as well as air entrapment. Another important aspect of the operation of a successful and acceptable homogenization method must avoid glass level fluctuation at the feeder, and yet maintain an adequate glass level above the stirrer.

As set forth in the appended claims, applicants' invention relates specifically to the combination of blenders, homogenizers and stationary plates which result in removing cord from moving in a feeder forehearth.

We claim:

1. Method of mixing and blending molten glass in a forehearth, comprising the steps of:
   rotating a pair of side-by-side blenders upstream of the feeder end of the forehearth, said blenders effectively raising the glass in the zone of their influence;
   rotating a plurality of homogenizers, spaced in a line transverse of the direction of flow of the glass in the forehearth, said homogenizers being between the blenders and the feeder, said homogenizers effectively pushing the glass downward in their zone of influence; and
   positioning a plurality of elongated, vertical plates with their lower edge extending adjacent to the bottom of the forehearth with the vertical plane of the face of the plates extending in the direction of the glass flow whereby glass moving from the blender zone to the homogenizer zone is attenuated by the plates and cords free glass is fed to the feeder.

2. Apparatus for mixing and blending molten glass in a forehearth, comprising:
   a pair of laterally positioned blenders upstream of the feeder end of the forehearth, said blenders effectively raising the glass in the zone of their influence;
   a plurality of homogenizers, spaced in a line transverse of the direction of flow of the glass in the forehearth, said homogenizers being positioned between the blenders and the feeder, said homogenizers effectively pushing the glass downward in their zone of influence; and
   a plurality of elongated, vertical plates immersed in the molten glass between the blenders and homogenizers, said plates being oriented with their length parallel to the direction of flow of glass in the forehearth whereby glass moving from the blender zone to the homogenizer zone is attenuated by the plates and cord free glass is fed to the feeder.

3. The apparatus of claim 2 wherein said plates are three in number and generally evenly spaced with regard to the width of the forehearth.

4. The apparatus of claim 2 wherein the diameter of said blenders is at least one-fourth the width of the forehearth.

5. The apparatus of claim 3 wherein said plates have a length of 1/5 to 1/3 the distance between the blenders and homogenizers and extend the full depth of the forehearth.

6. The apparatus of claim 4 in which said blenders are helical stirrers having a diameter of up to 7 inches.

7. The apparatus of claim 2 wherein said blenders and homogenizers extend into the glass to within 2.0 to 3.5 inches of the bottom thereof.

8. The apparatus of claim 2 wherein said blenders and homogenizers are rotated at about 20 rpm and the blenders have the upper end of the helix at a sufficient depth so as to avoid entrapment of air from the surface of the molten glass by rotation thereof.

* * * * *